US009235626B2

(12) United States Patent
Liu et al.

(10) Patent No.: US 9,235,626 B2
(45) Date of Patent: Jan. 12, 2016

(54) AUTOMATIC GENERATION OF SNIPPETS BASED ON CONTEXT AND USER INTEREST

(71) Applicant: GOOGLE INC., Mountain View, CA (US)

(72) Inventors: Sean Liu, El Dorado, CA (US); Gunes Erkan, Brooklyn, NY (US); Doug Sherrets, San Francisco, CA (US); Max Ventilla, San Francisco, CA (US); Frances Bordwell Haugen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 13/801,163

(22) Filed: Mar. 13, 2013

(65) Prior Publication Data
US 2015/0161130 A1 Jun. 11, 2015

(51) Int. Cl.
G06F 17/30 (2006.01)
(52) U.S. Cl.
CPC ...... *G06F 17/3053* (2013.01); *G06F 17/30867* (2013.01)
(58) Field of Classification Search
None
See application file for complete search history.

(56) References Cited

U.S. PATENT DOCUMENTS

| 7,328,216 | B2 | 2/2008 | Hofmann et al. |
| 7,502,770 | B2 | 3/2009 | Hillis et al. |
| 7,587,387 | B2 | 9/2009 | Hogue |
| 7,765,206 | B2 | 7/2010 | Hillis et al. |
| 7,769,579 | B2 | 8/2010 | Zhao et al. |
| 7,774,328 | B2 | 8/2010 | Hogue et al. |
| 7,792,837 | B1 | 9/2010 | Zhao |
| 7,917,480 | B2 | 3/2011 | Dean et al. |
| 7,925,610 | B2 | 4/2011 | Elbaz et al. |
| 8,122,026 | B1 | 2/2012 | Laroco et al. |
| 8,204,856 | B2 | 6/2012 | Meyer et al. |
| 8,244,721 | B2 | 8/2012 | Morris et al. |
| 8,631,006 | B1 * | 1/2014 | Haveliwala et al. ........ 707/732 |
| 2005/0076003 | A1 | 4/2005 | DuBose et al. |
| 2006/0036593 | A1 | 2/2006 | Dean et al. |
| 2010/0121839 | A1 | 5/2010 | Meyer et al. |
| 2010/0262615 | A1 * | 10/2010 | Oztekin et al. ............. 707/768 |
| 2011/0010367 | A1 | 1/2011 | Jockish et al. |

FOREIGN PATENT DOCUMENTS

WO 2010085523 A1 7/2010

OTHER PUBLICATIONS

Kim, et al, "Personalized Search Results With User Interest Hierarchies Learnt from Bookmarks", Proceedings of the 7th International Conference on Knowledge Discovery on the Web: Advances in Web Mining and Web Usage Analysis, 2005, pp. 158-176.

Li, et al, "Personalized Text Snippet Extraction Using Statistical Language Models", Pattern Recognition, vol. 42, Sep. 17, 2008, pp. 378-386.

(Continued)

*Primary Examiner* — Hung Q Pham
(74) *Attorney, Agent, or Firm* — Brake Hughes Bellermann LLP

(57) ABSTRACT

A system obtains a document that is responsive to a user query. The system determines an interest of the user based on stored data associated with the user, and determines that a portion of the document relates to the interest of the user. The system generates a first snippet for the document based on the portion of the document that relates to the interest of the user, and provides the first snippet for the document as part of a result list.

16 Claims, 7 Drawing Sheets

(56) References Cited

OTHER PUBLICATIONS

Ma, et al, "Interest-Based Personalized Search", ACM Transactions on Information Systems, vol. 25, No. 1, Article 5, Feb. 2007, 38 pages.

Qiu, et al, "Automatic Identification of User Interest for Personalized Search", WWW, May 22, 2006, 10 pages.

Speretta, "Personalizing Search Based on User Search Histories", B.Sc., Udine University, Udine, Italy, 2000, 64 pages.

Teevan, et al, "Discovering and Using Groups to Improve Personalized Search", WSDM, Feb. 9, 2009, 10 pages.

Teevan, et al, "Personalizing Search via Automated Analysis of Interests and Activities", SIGIR, Aug. 15, 2005, pp. 449-456.

* cited by examiner

AUTOMATIC GENERATION OF SNIPPETS BASED ON CONTEXT AND USER INTEREST

BACKGROUND

This description relates generally to the generation and presentation of search query results.

SUMMARY

This disclosure includes a system and method that provide search results with snippet information from a part of a web page, accounting for what a user might find interesting, based on long standing interests of the user, and based on more recent interests, such as search queries. A snippet may include a title, sub-title, description, or other information related to a search result presented to a user.

In one implementation, a system includes at least one processor, and a memory that stores instructions that, when executed by the at least one processor, cause the system perform operations of: obtaining a document that is responsive to a user query, determining an interest of the user based on stored data associated with the user, determining that a portion of the document relates to the interest of the user, generating a first snippet for the document based on the portion of the document that relates to the interest of the user, and providing the first snippet for the document as part of a result list.

Other implementations of this aspect include corresponding methods, apparatus, and computer programs, configured to perform the actions of the methods, encoded on computer storage devices.

These and other implementations can each include one or more of the following features. The system can refine the first snippet for the document. The system can analyze text around the first snippet, compare to the first snippet a ranking of entities in the document related to the interest, and generate a second snippet for the document based on the comparing. Ranking the first snippet and the second snippet can be based on a ranking of entities in the document related to a previous user query. The system can determine that the first snippet ranks higher than the second snippet. The system can generate a second snippet for the document based on the user query, and provide the second snippet in addition to the first snippet as part of the result list. The system can provide the first snippet in a callout. The system may provide a control that allows the user to toggle between a first view of the first snippet and a second view of the second snippet. The system may provide the first snippet in a first area of a display device and the second snippet in a second area of the display device. The first snippet may be a title for the document, or may include an image. The interest of the user may be determined based on a search history associated with the user. The system may limit the search history to within a predetermined period of time from the user query. The system may annotate the first snippet to visually indicate the interest. The system may score the first snippet by weighting an amount of overlap between the user query and the snippet. The system may score the first snippet by weighting an amount of overlap between the interest and the snippet. The system may display the first snippet in a callout upon detecting a cursor hover over a specific portion of the result list associated with the first snippet. The system may expand a display of the first snippet upon receiving a user selection of the first snippet.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
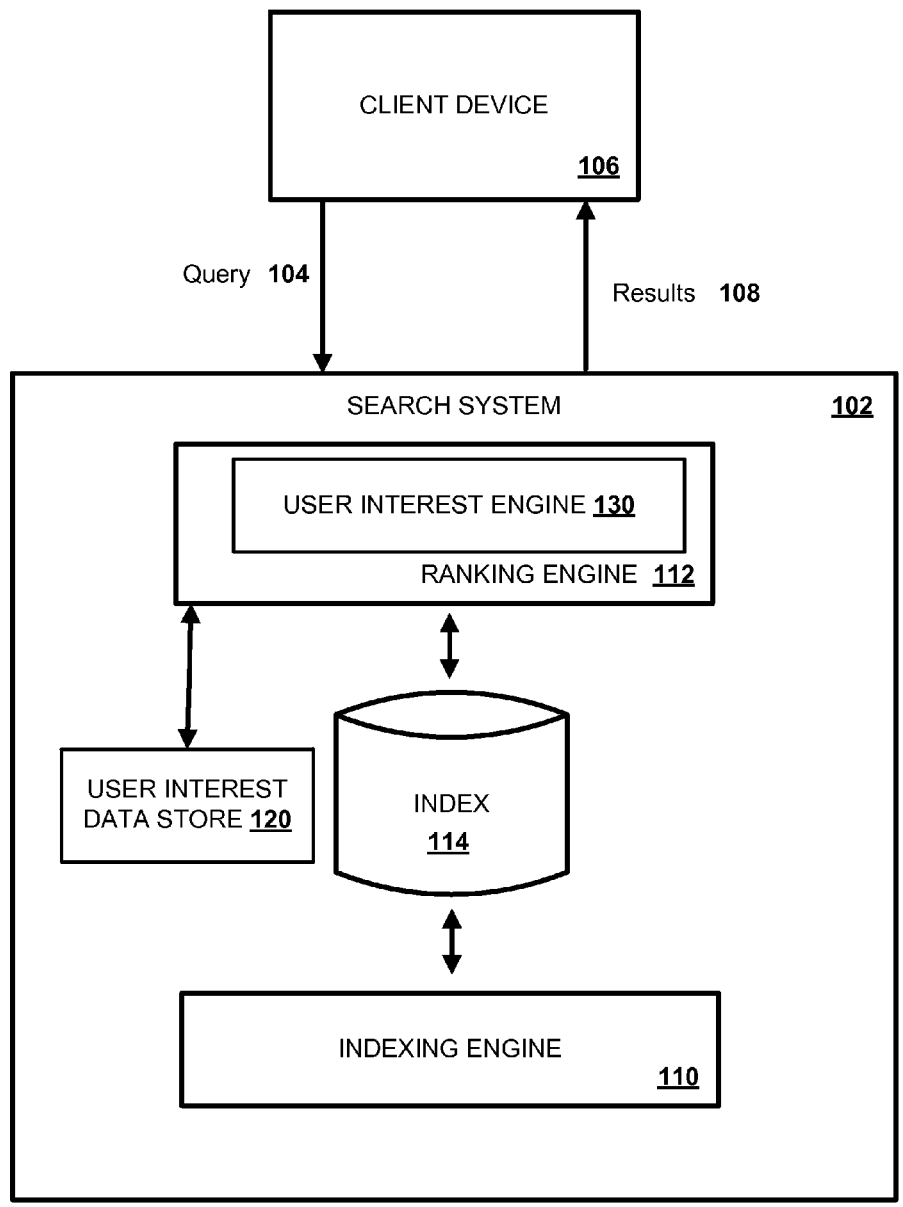
FIG. 1 illustrates an example search system.

FIG. 1 illustrates an example search system 102. The search system 102 can be implemented on one or more computers that communicate, for example, through a network. The search system receives queries 104 from a client device 106 and returns results 108 in response to the queries. Each query 104 is a request for information. The query 104 can be, for example, in text form or in other forms, for example, in audio form or in image form.

The search system 102 and the client device 106 can communicate through a network, for example, an intranet or the Internet. While the search system 102 and the client device 106 are shown as two separate devices, in some implementations, the search system 102 and the client device 106 can be the same device.

The search system 102 includes an indexing engine 110 and a ranking engine 112. The indexing engine 110 maintains an index 114 for use by the search system 102. The indexing engine 110 processes documents and updates index entries in the index 114, for example, using conventional or other indexing techniques.

In some implementations, the search system 102 may maintain user interest data store 120. In the instance where a user consents to the use of such data, the user interest data store 120 may include one or more websites, text, search queries, demographic data, other user interest information that may be used by system 102. In some implementations, the user interest data store 120 may classify search queries by user, by frequency, by location, and by date or time, where the user consents to the use of such data. In some implementations, the user interest data store 120 may be included as part of index 114.

The user interest engine 130 may use the user interest data store 120 to identify context information in a web page that is related to a query 104 using techniques described here, for example as discussed in more detail below with respect to FIG. 3. In some implementations, user interest engine 130 may analyze a query 104 to locate one or more terms from the query 104 in common with queries of social media contacts of the user making the query 104.

The ranking engine 112 uses the index 114 to identify documents responsive to the query 104, for example, using conventional or other information retrieval techniques. The ranking engine 112 calculates scores for the documents responsive to the query, for example, using one or more ranking signals. Each signal provides information about the document itself or the relationship between the document and the query. One example signal is a measure of the overall quality of the document. Another example signal is a measure of the number of times the terms of the query occur in the document. Other signals can also be used. The ranking engine 112 then ranks the responsive documents using the scores.

The ranking engine 112 may include a user interest engine 130. Although user interest engine 130 is depicted as part of ranking engine 112, in various implementations, user interest engine 130 may be included as part of indexing engine 110, or as a separate engine within search system 102. User interest engine 130 may, analyze query 104 to determine if one or more terms are associated with a user's interest, using user interest data store 120, for example.

As a simplified example, a user making query 104 might have just searched for "beach vacations" and, in query 104, searched for "LA hotels". The user interest engine 130 may provide a snippet (e.g., title or text description) that refers to a "beach" experience to be included in a result based on the query 104. A snippet may include an extract of text from a document that is displayed to the query requestor as part of a search result. In some implementations, the user interest engine 130 may provide a snippet by ranking the documents differently from the ranking engine 112, or, when there are matches for "beach" or other interests, such as "Italian food," in one or more documents in the search results, by adjusting what appears as a snippet in the ranked results without re-ranking the search results for "LA hotels".

Figure 2A:
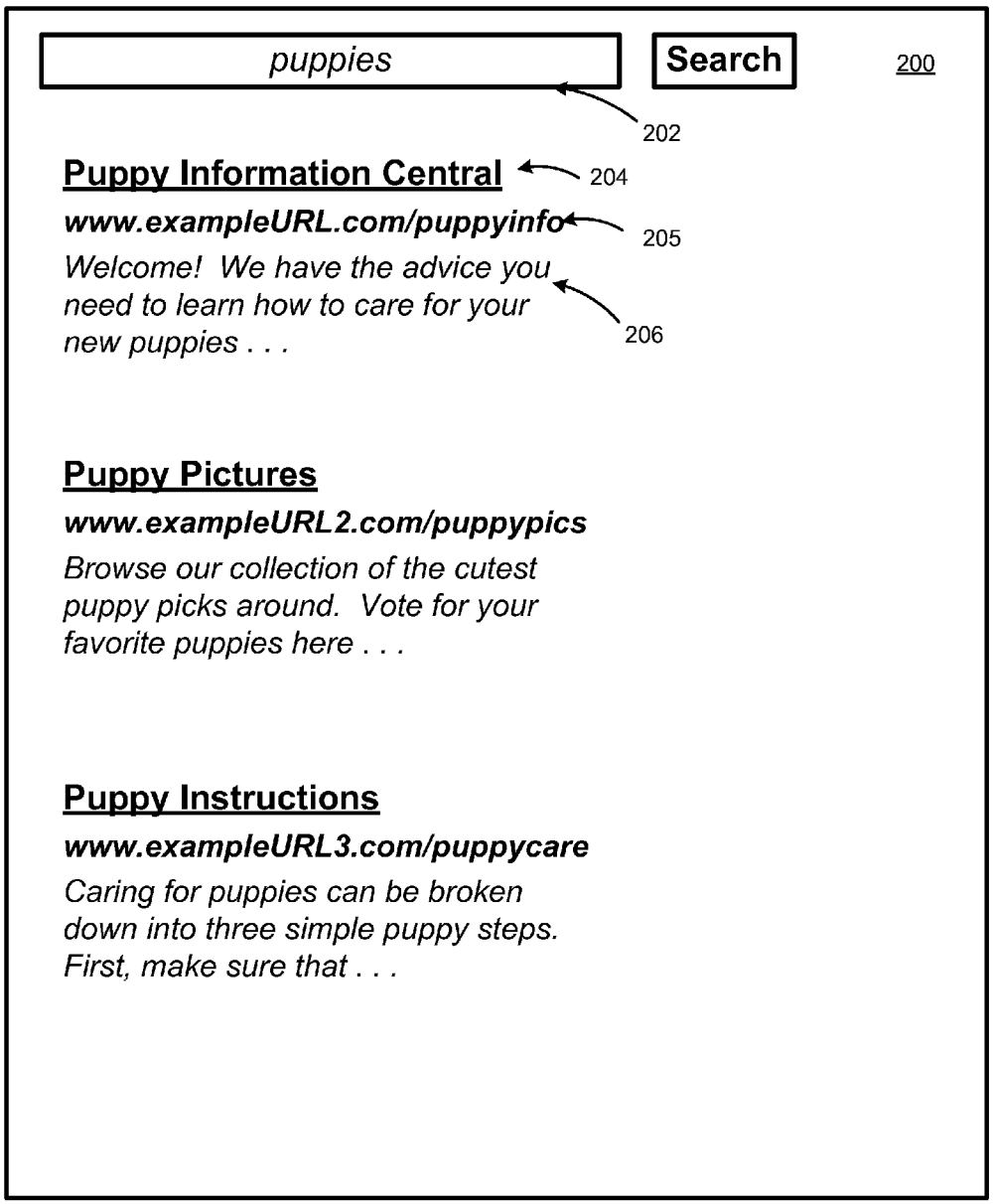
FIG. 2A is an example search user interface.

FIG. 2A is an example search user interface. As shown in FIG. 2A, a system such as system 102 may present a user interface 200 including a search bar 202 or other search feature. A user may input a search query, such as "puppies," into search bar 202 of user interface 200. The system 102 may return one or more results. In the example shown in FIG. 2A, results include a title 204 "Puppy Information Central." The results may also include a snippet 205 "www.exampleURL.com/puppyinfo", and a snippet 206, including, for example, text such as "Welcome! We have the advice you need to learn how to care for your new puppies . . . ".

Figure 2B:
FIG. 2B is an example search user interface.

FIG. 2B is an example search user interface. As shown in FIG. 2B, a system such as system 102 may present a title 210 "Outdoors activities in San Francisco", which may be expanded upon selection of icon 216. The system may also present sub title 212 "Golden Gate Bridge" with a snippet 214 "most visited and photographed bridge . . . ", which may also be expanded upon selection of icon 218.

The system, such as the system 102 described above with respect to FIG. 1, may select a snippet for display to the query requestor based on whether there is a keyword match for the query. For example, a query for "outdoor activities in San Francisco" may include a result with the snippet "San Francisco Attractions: What to do & Places to Visit in San Francisco. Home San Francisco . . . Sports, Golf and Outdoor Activities (23). Religious Sites (20)." The system may access user interest data store 120 shown in FIG. 1 to determine that the query requestor likes photography, and may update the snippet to include "photography" in place of other text. In some implementations, the system can elevate certain interests to appear as a sub-title, such as sub title 212, to link directly to that content. In some implementations, particularly high ranking content can appear as a title link, such as title 210.

In various implementations, the system can customize results and snippets based on the user's interests. As mentioned above with respect to FIG. 1, a user interest data store may include user interest data. Such data may include an interest model built around the user, which includes entities the user has affinity for, such as places, locations, stores, businesses, authors, a location of the user, etc. If the system detects these entities anywhere in a document, then the system may bias toward selecting these portions of the document as snippets.

Figure 2C:
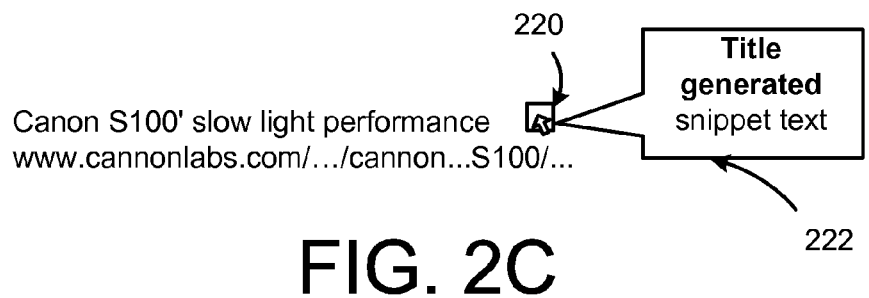
FIG. 2C is an example search user interface.

FIG. 2C is another example search user interface. As shown in FIG. 2B, a user may hover a cursor over a portion of a result list, such as icon 220, to view a user specific snippet 222. The user specific snippet 222 may include a specific title for the document that is generated for the user and other text from the document that is generated based on, for example, specific text related to the user query, a previous user query, or the interests of the user. The user specific snippet 222 may be provided in a callout, that is, a short string of letters and symbols, connected by a line, arrow, point of a balloon shape, or graphic to a feature of a list, illustration, or graphical user interface element (such as icon 220). The callout may give information about the graphical user interface element or other associated document. A callout may alternatively or additionally include a short piece of text set in a different font or larger type than the rest of a page.

Figure 2D:
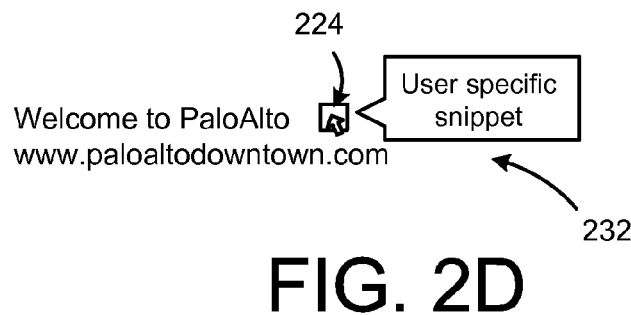
FIG. 2D is an example search user interface.

FIG. 2D is another example search user interface. As shown in FIG. 2C, a user may hover a cursor over a portion of a result list, such as icon 224, to view a user specific snippet 232. The user specific snippet 232 may include specific text from the document that is related to both the user query and the interests of the user.

Figure 2E:
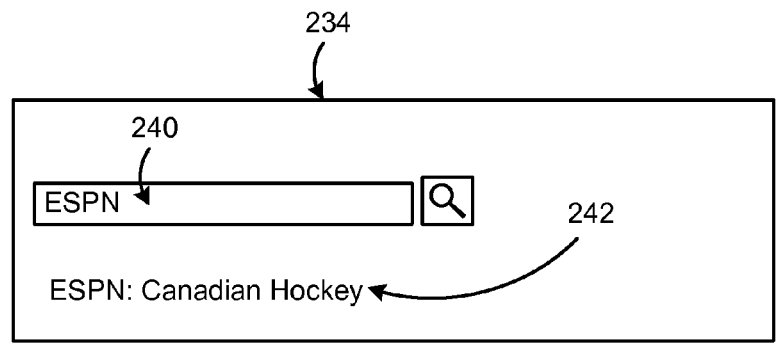
FIG. 2E is an example search user interface.

FIG. 2E is another example search user interface. As shown in FIG. 2D, a user interface 234 may include a search input area 240. If a user enters a query, such as "ESPN" in the search input area 240, the system may return a set of results, including result with snippet 242 "ESPN: Canadian Hockey." The system may generate at least a portion of snippet 242 "Canadian Hockey" customized for the user based on the user interest in hockey and the user's location in Canada.

Figure 2F:
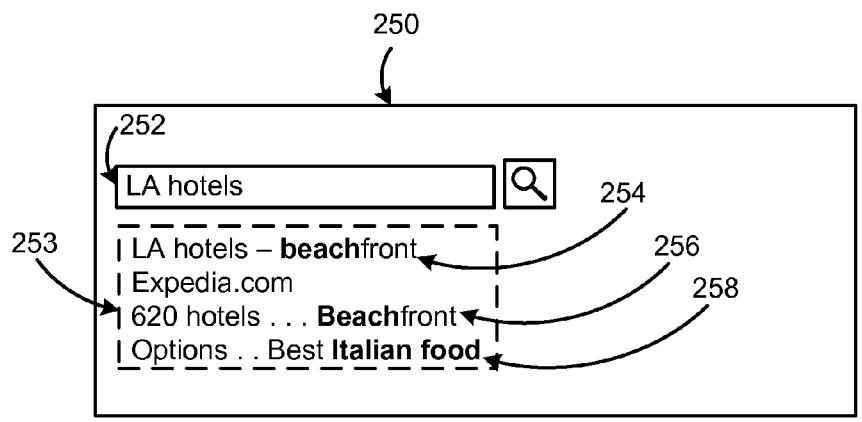
FIG. 2F is an example search user interface.

FIG. 2F is another example search user interface. User interface 250 includes a search input area 252. If a user enters a query, such as "LA hotels" in the search input area 252, the system may generate return a set of results including one or more snippets. The set of results may include a result 253 with snippets 254, 256, and 258. A snippet 254 "LA hotels—beachfront" is displayed by the system based on the user query, and based on a recent search by the user for "beach vacations." Similarly, the system may present snippet 256 based on the user query, and based on a recent search by the user for "beach vacations." The snippet 258 "Options . . . Best Italian foods" is displayed by the system based on the user query, and based on a user entered interest in Italian food, for example, where the user previously entered such an interest into the system. Various portions of snippets 254, 256, or 258 may be annotated, highlighted, etc. to indicate that portions of the snippets relate to a user's interest.

Figure 3:
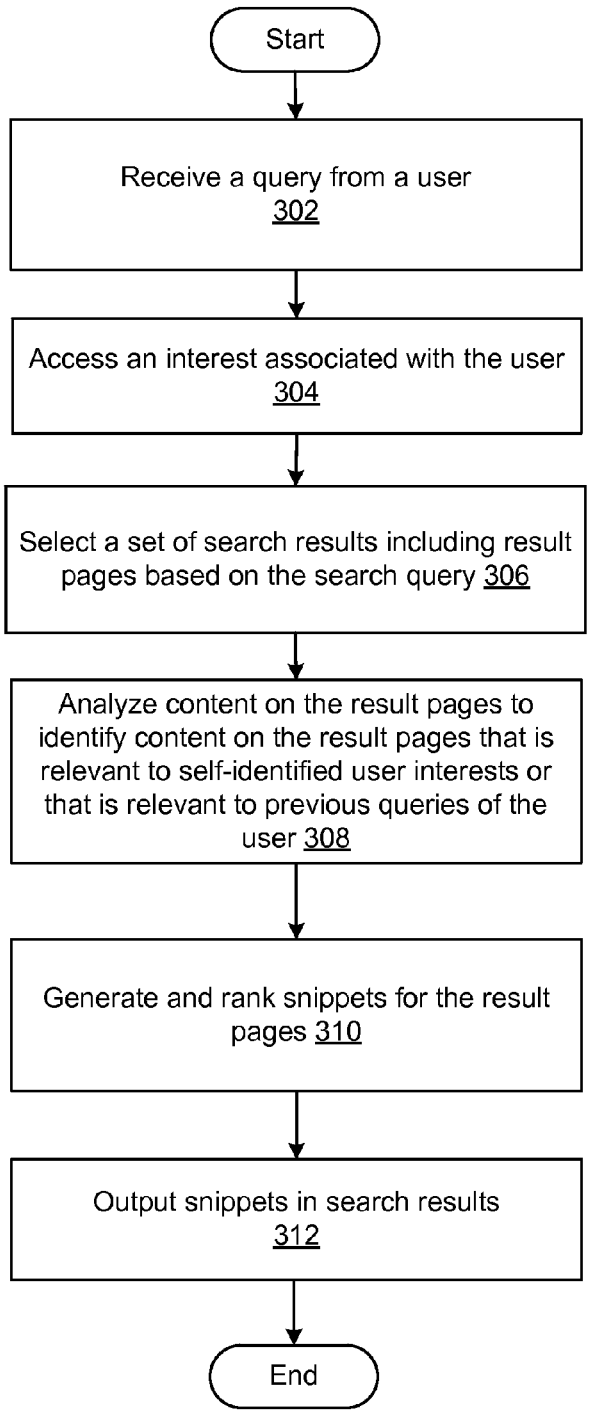
FIG. 3 is a flow chart illustrating an example method of customized snippet generation.

FIG. 3 a flow chart illustrating an example method of customized snippet generation. For convenience, the steps of the flow chart are described with reference to a system that performs the steps. The system can be, for example, search system 102 described above with reference to FIG. 1, component 112 described above with reference to FIG. 1, or other systems.

In the example of FIG. 3, the system receives a search query from a user (302), for example in the form of a text input. The system accesses one or more interests associated with the user who made the search query (304). In instances where a user consents to the use of such data, the interests may be stored in the user interest data store 120 as shown in FIG. 1, in the index 114, or in one or more other data stores accessible by the system. Interests may include, for example, text, geographic locations, prior search queries, demographic data, social media data (such as recent purchases or self-supplied interests of close friends), and other information, in cases where a user consents to the use of such data.

The system selects a set of search results, including result pages, based on the search query (306). The system analyzes content of the result pages to identify specific content on the result pages that is relevant to self-identified user interests or that is relevant to previous queries of the user (308). In some implementations, the system may focus on headers and sub-headers identifying parts of the page. In some implementations, entities or interests that are identified on the page are analyzed (e.g., using user interest engine 130) to determine whether the entities or interests are represented on the page and whether those entities or interests relate to user-identified interests. As one example, the system may determine if entities are represented on a page by automatically scanning or searching various portions of the page, such as headers and sub-headers of the page, to verify that entities are in fact represented on the page. To do so, the system may examine default titles of the page. Default titles are titles written by a website owner in the HTML code of the website or document(s). For example, HTML standard includes a default <title> tag. The system can generate non-default titles using other information on a page, such as headers or sub-headers on the page, or a link text that is pointing to a page. Among these non-default alternate titles, the system may select and display one that matches the user's query and preferences best. To select the best match, the system can scan the headers and sub-headers on a page and generate alternate (non-default) titles or sub-titles for a page. This scanning may be done offline, pre-search, and the results may be indexed already such that the system can fetch these headers during the search. If the user's personal interests or preferences match any of the alternate (non-default) headers, those headers may be ranked higher and displayed in the search results.

The system may identify entities using, for example, a data graph such as a knowledge graph or other technology. In some implementations, the system may utilize a query-to-entity map or an entity-to-query map, which may be used to identify entities on a page that may interest a particular user. For example, any entity name in a header can be identified using a knowledge graph or similar data. A header may partially or fully match an entity name and may match multiple entities. In various implementations, headers can be ranked by how well they match the entities, and how many of the entities are matched that are related to a user's interests.

As an example, the system may determine that a user has previously self-identified an interest in "outdoor activities," for example by accessing stored data associated with the user, if the user has consented to the use of such data. The system may determine if the interest in "outdoor activities" is represented on the page automatically scanning or searching various portions of the page using a knowledge graph to verify that the interest is represented on the page. As discussed above, the system may have previously scanned the page and indexed the results.

As one example, as part of a search result for a query for "outdoors activities in San Francisco," there might be a set of places shown on a page that have keywords related to the term "outdoors." A title or sub-title for the page may be generated based on the analysis, such as "Outdoors activity in San Francisco," optionally with links available, linking directly to the content about the outdoors. As another example, the system may identify a user interest in "photography" and "ocean views." The system may provide, as part of the search result, content related to "photography" that identifies a place in San Francisco that is particularly popular with people who like photography. The system may generate a title or sub-title for the page based on the analysis described above. The title may be, for example, "Photographer lovers' favorite restaurant with ocean views."

A snippet may include a title, sub-title, description, or other information related to a search result presented to a user. The system generates and ranks snippets for the result pages, for example by comparing default or pre-set titles to other available titles and sub-titles (310). In some implementations, the system may refine the content of snippets (e.g., titles, sub-titles, or descriptions), for example by repeating steps 306, 308, and 310. For example, the system may start with a snippet initially identified, and analyze text around the snippet and around the page, then compare the ranking of identified entities on the page related to user interests compared to what was initially identified as the snippet. The system may then generate one or more refined snippets based on the comparison. The system outputs snippets in search results based on context and interests associated with the user (312).

In some implementations, the output may include one or more of a ranked list, a set of links, images, a graph, a diagram, a file, or other output that identifies the results, for example as shown in FIGS. 2A through 2E. In some implementations, the list may be available for email to another user or may be shared via a social media website, with user consent. In some implementations, the list may be filtered or sorted and re-sorted by a user. Such sorting may be done via a user interface such as the user interface depicted in FIGS. 2A through 2E. In some implementations, a user may hover a cursor over a snippet in the list or otherwise select one or more elements in the list to obtain more information about the results, for example by clicking on a link.

In some implementations, the system scores potential snippets (e.g., in steps 306, 308, and 310) by weighting the amount of overlap via either the user's keywords or their interests. For example, the system may select a maximum from (score=$c1*keyword\text{-}overlap+SUM(c2\_i*interest\_i)$) where $c1$ and $c2$ are constants, or weights, that adjust how important keyword overlap and various interests are, that is, how much they contribute to the overall score.

In some implementations, for example as shown in FIGS. 2A through 2E, various user interfaces may indicate when there was a change in how the snippet is presented, and allow a user hover over a snippet to see that there was a change as well as click to see the original version of the snippet. In some implementations, a snippet that is selected may be annotated (e.g., highlighted, bolded, etc.) to indicate that no change was made to the snippet but that a particular portion of the snippet relates to the user's interests.

Some implementations may also use interests of a user's social media contacts to create snippets or promote a particular document in the search results. For example, if the user searches for "restaurants in NYC," the search engine may promote restaurants that the user's social media contacts (e.g., friends) have "liked" or ranked in the search results. In another implementation, the search engine may provide a friend's review as part of a snippet for the restaurant. The search engine may include the interests of a user's significant other or other friends to determine snippets, but not necessarily for promoting the ranking of a document within the search results. In some implementations, main search results may reflect snippets based on the user's interest, while snippets related to the user's friends' interests may be provided in a call-out, a roll-over, or some other portion of a user interface.

Figure 4:
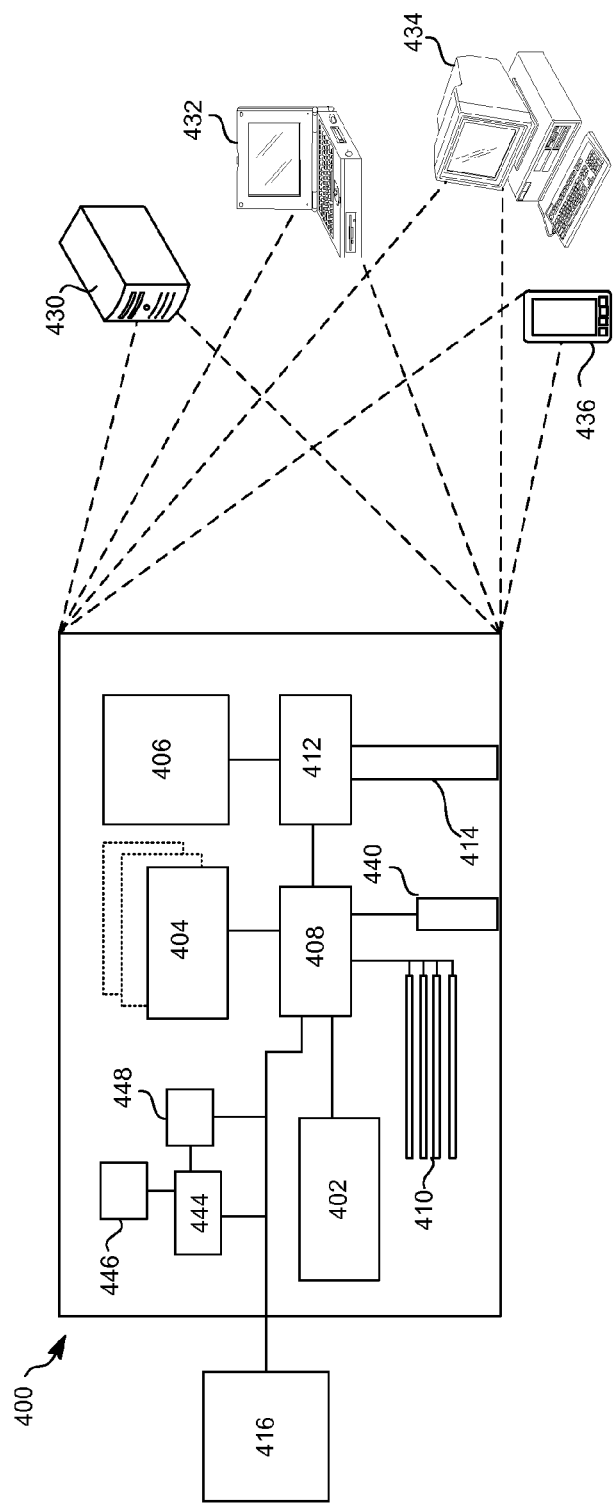
FIG. 4 is an example of a generic computer device that may be used with techniques described here.

FIG. 4 shows an example of a generic computer device 400, which may be system 102 of FIG. 1, and which may be used with the techniques described here. Computing device 400 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations described or claimed in this document.

Computing device 400 includes a processor 402, memory 404, a storage device 406, and expansion ports 410 connected via an interface 408. In some implementations, computing device 400 may include transceiver 446, communication interface 444, and a GPS (Global Positioning System) receiver module 448, among other components, connected via interface 408. Device 400 may communicate wirelessly through communication interface 444, which may include digital signal processing circuitry where necessary. Each of the components 402, 404, 406, 408, 410, 440, 444, 446, and 448 may be mounted on a common motherboard or in other manners as appropriate.

The processor 402 can process instructions for execution within the computing device 400, including instructions stored in the memory 404 or on the storage device 406 to display graphical information for a GUI on an external input/output device, such as display 416. Display 416 may be a monitor or a flat touchscreen display. In some implementations, multiple processors or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk. In some implementations, the memory 404 may include expansion memory provided through an expansion interface.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 404, the storage device 406, or memory on processor 402.

The interface 408 may be a high speed controller that manages bandwidth-intensive operations for the computing device 400 or a low speed controller that manages lower bandwidth-intensive operations, or a combination of such controllers. An external interface 440 may be provided so as to enable near area communication of device 400 with other devices. In some implementations, controller 408 may be coupled to storage device 406 and expansion port 414. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 430, or multiple times in a group of such servers. It may also be implemented as part of a rack server system. In addition, it may be implemented in a personal computer such as a laptop computer 422, or smart phone 436. An entire system may be made up of multiple computing devices 400 communicating with each other. Other configurations are possible.

Figure 5:
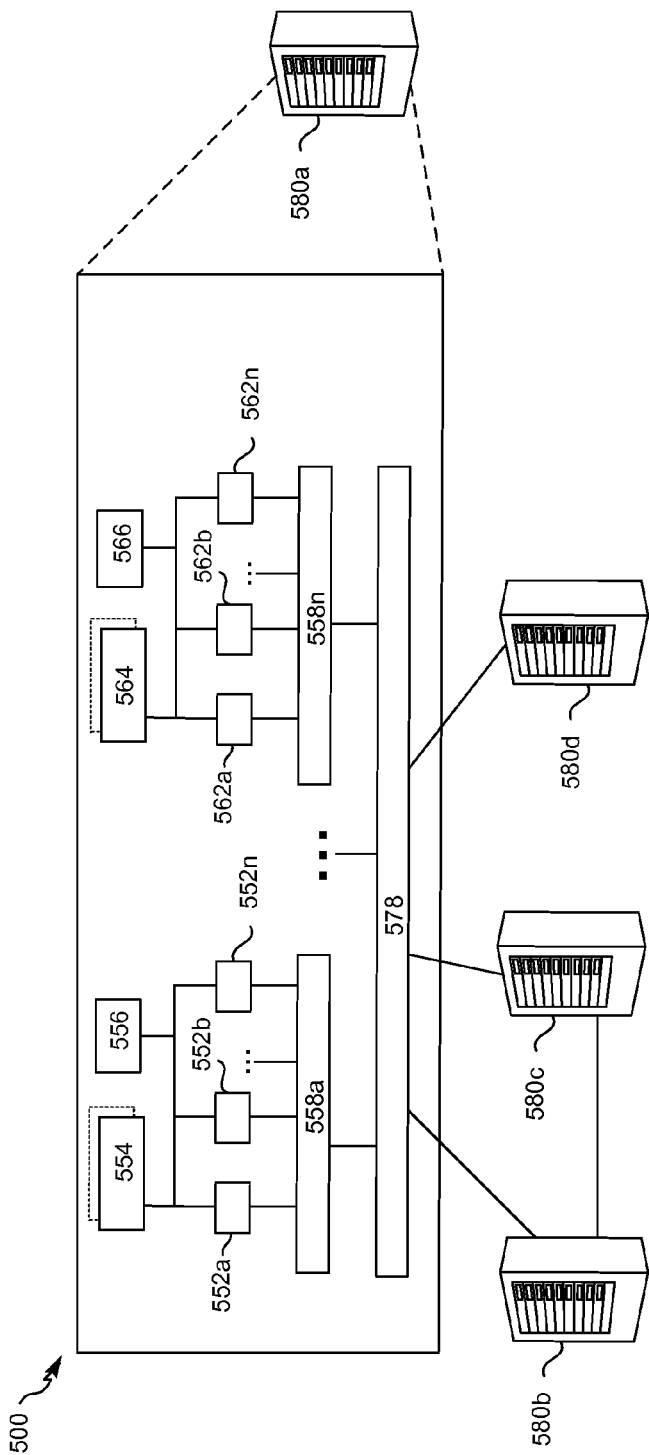
FIG. 5 is an example of a generic computer device that may be used with techniques described here.

FIG. 5 shows an example of a generic computer device 500, which may be system 102 of FIG. 1, which may be used with the techniques described here. Computing device 500 is intended to represent various example forms of large-scale data processing devices, such as servers, blade servers, datacenters, mainframes, and other large-scale computing devices. Computing device 500 may be a distributed system having multiple processors, possibly including network attached storage nodes that are interconnected by one or more communication networks. The components shown here, their connections and relationships, and their functions, are meant to be exemplary only, and are not meant to limit implementations described or claimed in this document.

Distributed computing system 500 may include any number of computing devices 580. Computing devices 580 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 580a includes multiple racks 558a-558n. Each rack may include one or more processors, such as processors 552a-552n and 562a-562n. The processors may include data processors, network attached storage devices, and other computer controlled devices. In some implementations, one processor may operate as a master processor and control the scheduling and data distribution tasks. Processors may be interconnected through one or more rack switches 558, and one or more racks may be connected through switch 578. Switch 578 may handle communications between multiple connected computing devices 500.

Each rack may include memory, such as memory 554 and memory 564, and storage, such as 556 and 566. Storage 556 and 566 may provide mass storage and may include volatile or non-volatile storage, such as network-attacked disks, floppy disks, hard disks, optical disks, tapes, flash memory or other similar solid state memory devices, or an array of devices, including devices in a storage area network or other configurations. Storage 556 or 566 may be shared between multiple processors, multiple racks, or multiple computing devices and may include a computer-readable medium storing instructions executable by one or more of the processors. Memory 554 and 564 may include, e.g., volatile memory unit or units, a non-volatile memory unit or units, or other forms of computer-readable media, such as a magnetic or optical disks, flash memory, cache, Random Access Memory (RAM), Read Only Memory (ROM), and combinations thereof. Memory, such as memory 554 may also be shared between processors 552a-552n. Data structures, such as an index, may be stored, for example, across storage 556 and memory 554. Computing device 500 may include other components not shown, such as controllers, buses, input/output devices, communications modules, etc.

An entire system, such as search system 102, may be made up of multiple computing devices 500 communicating with each other. For example, device 580*a* may communicate with devices 580*b*, 580*c*, and 580*d*, and these may collectively be known as system 102. As another example, system 102 of FIG. 1 may include one or more computing devices 500 as indexing engine 110, a separate computing device 500 as search system 102, and one or more computing devices 500 as index 114. Furthermore, some of the computing devices may be located geographically close to each other, and others may be located geographically distant. The layout of system 500 is an example only and the system may take on other layouts or configurations.

Various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural or object-oriented programming language, or in assembly/machine language. As used herein, the terms "machine-readable medium" "computer-readable medium" refers to any non-transitory computer program product, apparatus or device (e.g., magnetic discs, optical disks, memory (including Read Access Memory), Programmable Logic Devices (PLDs)) used to provide machine instructions or data to a programmable processor.

The systems and techniques described here can be implemented in a computing system that includes a back end component, for example, as a data server, or that includes a middleware component such as an application server), or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the disclosure. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   at least one processor; and
   a memory that stores instructions that, when executed by the at least one processor, cause the system to perform operations of:
      obtaining a document that is responsive to a user query,
      determining an interest of the user based on stored data associated with the user, wherein the interest of the user is determined based on a search history associated with the user, and wherein the search history is limited to within a predetermined period of time from the user query,
      determining that a portion of the document relates to the interest of the user,
      generating a first snippet for the document based on the portion of the document that relates to the interest of the user, and
      providing the first snippet for the document as part of a result list.

2. The system of claim 1, the instructions causing the system to further perform the operations of:
   refining the generated first snippet for the document prior to providing the first snippet.

3. The system of claim 1, the instructions causing the system to further perform the operations of:
   analyzing text within the document to identify entities in the document related to the interest of the user;
   comparing to the generated first snippet the entities in the text; and
   generating a second snippet for the document based on the comparing.

4. The system of claim 3, the instructions causing the system to further perform the operations of:
   ranking the generated first snippet and the second snippet using a set of entities in the document that are related to a previous user query; and
   determining that the generated first snippet ranks higher than the second snippet.

5. The system of claim 1, the instructions causing the system to further perform the operations of:
   generating a second snippet for the document based on the user query; and
   providing the second snippet in addition to providing the first snippet as part of the result list.

6. The system of claim 5, the instructions causing the system to further perform the operations of:
   providing a control that allows the user to toggle between a first view of the first snippet and a second view of the second snippet.

7. The system of claim 1, the instructions causing the system to further perform the operations of:
   providing the first snippet in a callout.

8. The system of claim 1, the instructions causing the system to further perform the operations of:
   annotating the first snippet to visually indicate the interest.

9. The system of claim 1, the instructions causing the system to further perform the operations of:
   scoring the first snippet by weighting an amount of overlap between the user query and the snippet.

10. The system of claim 1, the instructions causing the system to further perform the operations of:
    scoring the generated first snippet by weighting an amount of overlap between the interest and the snippet.

11. A method comprising:
obtaining, by searching a set of documents using a processor of a computing device, a document that is responsive to a user query;
determining an interest of the user based on stored data associated with the user;
determining that a portion of the document relates to the interest of the user;
generating a first snippet for the document based on the portion of the document that relates to the interest of the user; and
providing the first snippet for the document as part of a result list, wherein the first snippet is provided in a format to be displayed in a callout upon detecting a cursor hover over a specific portion of the result list associated with the first snippet.

12. The method of claim 11, further comprising:
generating a second snippet for the document based on the user query; and
providing the second snippet in addition to providing the first snippet as part of the result list.

13. The method of claim 12, further comprising:
providing a control that allows the user to toggle between a first view of the provided first snippet and a second view of the provided second snippet.

14. A non-transitory computer readable medium including instructions that when executed cause a system to:
obtain a document that is responsive to a user query;
determine an interest of the user based on stored data associated with the user;
determine that a portion of the document relates to the interest of the user;
generate a first snippet for the document based on the portion of the document that relates to the interest of the user;
generate a second snippet for the document based on the user query;
provide the first snippet and the second for the document as part of a result list; and
provide a control that allows the user to toggle between a first view of the first snippet and a second view of the second snippet.

15. The non-transitory computer readable medium of claim 14, the instructions further including instructions that when executed cause the system to:
annotate the first snippet to visually indicate the interest.

16. The non-transitory computer readable medium of claim 14, the instructions further including instructions that when executed cause the system to:
score the first snippet by weighting an amount of overlap between the interest and the snippet.

* * * * *